(12) United States Patent
Liu

(10) Patent No.: US 12,463,202 B2
(45) Date of Patent: Nov. 4, 2025

(54) METHOD FOR THE PRODUCTION OF A SILICON-GRAPHITE COMPOSITE MATERIAL

(71) Applicant: Talga Technologies Limited, Histon (GB)

(72) Inventor: Fengming Liu, Reading (GB)

(73) Assignee: TALGA TECHNOLOGIES LIMITED, Cambridge (GB)

( * ) Notice: Subject to any disclaimer, the term of this patent is extended or adjusted under 35 U.S.C. 154(b) by 0 days.

(21) Appl. No.: 18/987,944

(22) Filed: Dec. 19, 2024

(65) Prior Publication Data

US 2025/0149550 A1 May 8, 2025

Related U.S. Application Data

(63) Continuation of application No. PCT/IB2023/056554, filed on Jun. 26, 2023.

(30) Foreign Application Priority Data

Jun. 27, 2022 (AU) .................... 2022901793

(51) Int. Cl.
*H01M 4/36* (2006.01)
*H01M 4/38* (2006.01)
*H01M 4/587* (2010.01)

(52) U.S. Cl.
CPC .......... *H01M 4/364* (2013.01); *H01M 4/386* (2013.01); *H01M 4/587* (2013.01)

(58) Field of Classification Search
CPC ....... H01M 4/364; H01M 4/386; H01M 4/587
See application file for complete search history.

(56) References Cited

FOREIGN PATENT DOCUMENTS

| CN | 102881871 A | 1/2013 |
| CN | 107611416 A | 1/2018 |
| CN | 111834610 A | 10/2020 |

OTHER PUBLICATIONS

Nguyen; et al., "Magnesiothermic Reduction of Thin Films: Towards Semiconducting Chiral Nematic Mesoporous Silicon Carbide and Silicon Structures", Advanced Functional Material, Wiley—V CH Verlag GMBH & Co. KGAA, DE vol. 25, No. 14, Feb. 25, 2015 (Feb. 25, 2015), pp. 2175-2181, XP072292849,ISSN: 1616-301X, DOI: 10.1002/ADFM.201404304, 7 pages.
International Patent Application No. PCT/IB2023/056554, International Preliminary Report on Patentability dated Sep. 12, 2024, 8 pages.
International Patent Application No. PCT/IB2023/056554, Written Opinion dated Oct. 5, 2023, 6 pages.
International Patent Application No. PCT/IB2023/056554, Search Report dated Oct. 5, 2023, 6 pages.
Entwistle; et al., "A review of magnesiothermic reduction of silica to porous silicon for lithium-ion battery applications and beyond" Journal of Materials Chemistry A, vol. 6, No. 38, Oct. 14, 2018, pp. 18329-18730.

*Primary Examiner* — Andrew J. Oyer
(74) *Attorney, Agent, or Firm* — Leber IP Law; Celia H. Leber

(57) ABSTRACT

A method for the production of a silicon-graphite composite material, the method comprising subjecting a silicate containing graphite material to a magnesiothermic reduction process and thereby producing a silicon-graphite composite material. The method further provides for the production of a silicon and graphite composite material without the need for pre-synthesis of the silicate containing graphite material.

19 Claims, 2 Drawing Sheets

METHOD FOR THE PRODUCTION OF A SILICON-GRAPHITE COMPOSITE MATERIAL

RELATED APPLICATIONS

This application is a continuation of International Patent Application No. PCT/IB2023/056554, filed Jun. 26, 2023, which claims priority from Australian Patent Application No. 2022901793, filed Jun. 27, 2022, the entire disclosures of which are incorporated herein by reference.

FIELD OF THE INVENTION

The present invention relates to a method for the production of a silicon-graphite composite material.

More particularly, the method of the present invention comprises a magnesiothermic reduction of a silicate containing graphite material. It is intended that the method of the present invention does not require nor incorporate the pre-synthesis of the employed silicate containing graphite material.

BACKGROUND ART

Silicon and graphite composites are understood to be a promising material in the improvement of lithium-ion battery (LIB) anode capacity. There are however many acknowledged challenges for silicon and graphite composites for use as an anode material, including the expansion being experienced by these composites during lithiation/delithiation, and poor cycle life.

Efforts have been made to coat silicon onto a graphite surface and/or into the graphite by way of chemical vapour deposition (CVD), which is understood to provide good control of silicon thickness and fine particle size, with good cell performance. However, experience to date is limited to laboratory scale operations due to limitations in CVD equipment and the highly dangerous chemicals employed in the process, including SiH4.

Wet chemical methods can be used to coat silica onto a graphite surface. However, this coating requires high purity ethanol, tetraethoxysilane (TEOS) together with strict control of water content, pH and humidity. As the silicon content of TEOS is low, at about 13% wt/wt, the cost is very high for practical application.

Chinese Patent Specification CN111834610 describes the preparation of a lithium-ion battery silicon-carbon composite negative electrode material that utilises magnesiothermic reduction. An aqueous silica solution is first coated onto the surface of a graphite material by way of spray-drying. After a heat treatment step it is converted to graphite@$SiO_2$. After this synthesis of the graphite@$SiO_2$ material it is subjected to a magnesiothermic reduction step. The pre-synthesis of the graphite/silica material in this manner is particularly costly.

Chinese Patent Specification CN102881871 describes a method for preparing a graphite/silicon composite material for the negative electrodes of a lithium-ion battery. A wet method is described, in which silica is deposited on the surface of a graphite material requiring the hydrolysis of TEOS, described above. The deposited silica and the graphite material are then converted to graphite@silicon by way of magnesiothermic reduction. Again, this pre-synthesis of the graphite@$SiO_2$ is costly.

Chinese Patent Specification CN107611416 describes a silicon carbon composite material, and a method for the preparation and application thereof. The silicon carbon composite material is described as a sandwich layered porous silicon/graphene-like structured composite material. A wet process using ball milling is carried out on a mix of glass powder and flake-shaped graphite material to form small-sized and uniform mixtures. After this, the mixture, a magnesium powder and salt from an ingot, which is then passed to a Magnesiothermic reduction step. Again, the pre-synthesis of a graphite@silica or graphite@silicate material is costly, and the use of milled graphite material is typically not beneficial to battery performance due to the resulting high incidence of defects and a particularly high surface area (for example, the BET of the milled graphite material described in this Chinese disclosure is >100 m2/g).

The anode material and method of the present invention have as one object thereof to overcome substantially one or more of the above-mentioned problems associated with the prior art, or to at least provide a useful alternative thereto.

More specifically, it would be advantageous to provide a method by which a silicon and graphite composite may be prepared from a relatively low purity graphite starting material, without the need to produce pure silicon, which provides benefits over prior art methods.

Further, it would be advantageous to provide a method for the production of a silicon-graphite composite material that did not require the synthesis of a starting silica/silicate containing graphite material, and that could thereby overcome substantially one or more of the above-mentioned problems associated with the prior art.

The preceding discussion of the background art is intended to facilitate an understanding of the present invention only. This discussion is not an acknowledgement or admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Throughout the specification and claims, unless the context requires otherwise, the term silicate or a variation such as "silicates" or "silicate mineral", will be understood to include silica or $SiO_2$. The term "relative" or "relatively" used in respect of a feature of the invention is intended to indicate comparison to that feature in the prior art and the typical characteristics of that feature in the prior art, unless the context clearly indicates or requires otherwise.

Throughout the specification and claims it is to be understood that the term "Cg" indicates carbon in graphitic form.

It is to be understood that the ranges provided herein include the stated range and any value or sub-range within the stated range. For example, a range from about 1 micrometer (μm) to about 2 μm, or about 1 μm to 2 μm, should be interpreted to include not only the explicitly recited limits of from between from about 1 μm to about 2 μm, but also to include individual values, such as about 1.2 μm, about 1.5 μm, about 1.8 μm, etc., and sub-ranges, such as from about 1.1 μm to about 1.9 μm, from about 1.25 μm to about 1.75 μm, etc. Furthermore, when "about" and/or "substantially" are/is utilised to describe a value, they are meant to encompass minor variations (up to +/−10%) from the stated value.

DISCLOSURE OF THE INVENTION

In accordance with the present invention there is provided a method for the production of a silicon-graphite composite material, the method comprising subjecting a silicate containing graphite material to a magnesiothermic reduction process and thereby producing a silicon-graphite composite material.

Preferably, the silicate containing graphite material is either provided at a size of between about 1 to 25 μm or is reduced to this size ahead of the magnesiothermic reduction process.

Still preferably, the silicate content of the silicate containing graphite material ahead of the magnesiothermic reduction process is between about 1 to 30% wt/wt or is reduced to this level.

The temperature of a reduction step included in the magnesiothermic reduction process is preferably between about 600 and 900° C. In one form the magnesiothermic reduction process utilised in the method of the present invention requires no buffer.

Preferably, an oxidation step is provided immediately after the reduction step of the magnesiothermic reduction process.

Preferably, one or more purification steps are conducted after the magnesiothermic reduction process and by which by-products and impurities are substantially removed. A leach step is preferably one of the one or more purification steps conducted. In a preferred form the leach step is a first of the one or more purification steps.

Still preferably, magnesium oxide produced during the magnesiothermic reduction process is removed in the leach step.

In one form, the method for the production of a silicon-graphite composite material provides for the production of a silicon and graphite composite from a relatively low graphite content starting material without the need to produce pure silicon.

Preferably, the method for the production of a silicon-graphite composite material provides for the production of a silicon and graphite composite material without the need for pre-synthesis of the silicate containing graphite material.

In accordance with the present invention there is further provided a method for the production of a silicon-graphite composite material, the method comprising the following steps:
 (i) Drying a concentrate of a silicate containing graphite material;
 (ii) Mixing of the graphite material with magnesium powder;

A reduction step in which the mixture from step (ii) is transferred to a furnace whilst subject to a flow of an inert gas, at a temperature of about 600-900° C. for about 1-4 hrs, at the conclusion of which the mixture is allowed to cool;

An oxidation step in which as the temperature cools to about 500-550° C. the inert gas flow is stopped, and air is allowed into the furnace, after which the temperature of about 500-550° C. is maintained for about 1-2 hrs, at the conclusion of which the mixture is allowed to cool to room temperature; and A leach step in HCl, as a purification step, with a residence time of between about 1-3 hrs, after which the resulting residue/powder is separated.

In one form, the method further comprises additional purification step(s) in which the powder from step (v) is further purified.

In a further form, the method still further comprises surface modification in which the powder from steps (v) or (vi) is subjected to surface modification.

In accordance with the present invention there is further provided a method for the production of an anode comprising the silicon-graphite composite material produced by the method described hereinabove.

In accordance with the present invention there is still further provided a method for the production of a battery comprising an anode material prepared in accordance with the method described hereinabove.

In accordance with the present invention there is yet still further provided a silicon-graphite composite material produced by way of the method described hereinabove.

BRIEF DESCRIPTION OF THE DRAWINGS

The present invention will now be described, by way of example only, with reference to one embodiment thereof and the accompanying drawings, in which:

FIG. 1 is an X-ray diffraction (XRD) plot for (a) a silicate containing graphite material and (b) a silicon-graphite composite material produced by way of the method of the present invention, in which Gr=graphite and St=silicates, such as sodium calcium aluminium silicate, sodium tecto-aluminotrisilicate, sodium aluminium silicate, potassium magnesium phyllo-magnesiosilicate and the like;

BEST MODE(S) FOR CARRYING OUT THE INVENTION

Figure 1:
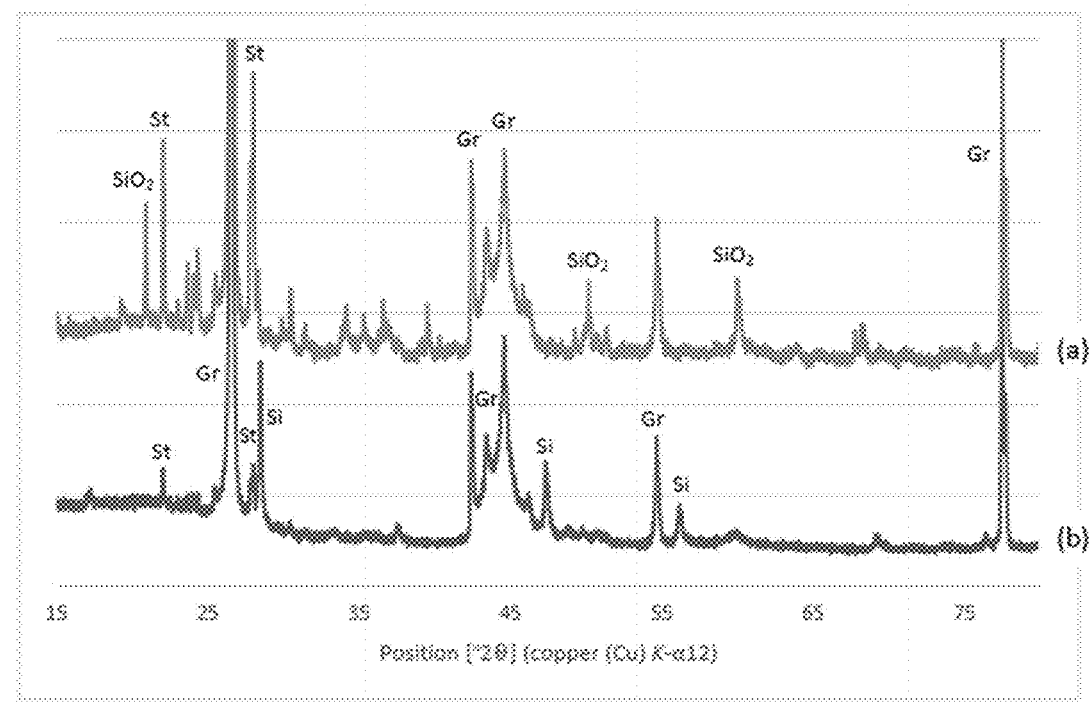

The present invention provides a method for the production of a silicon-graphite composite material, the method comprising subjecting a silicate containing graphite material to a magnesiothermic reduction process and thereby producing a silicon-graphite composite material.

The silicate containing graphite material is either provided at a size of between about 1 to 25 μm or is reduced to this size ahead of the magnesiothermic reduction process. The silicate content of the silicate containing graphite material ahead of the magnesiothermic reduction process is between about 1 to 30% wt/wt or is reduced to this level.

The temperature of a reduction step included in the magnesiothermic reduction process is between about 600 and 900° C., for example between about 650 and 900° C. In one form the reduction step included in the magnesiothermic reduction process utilised in the method of the present invention requires no buffer, such as a magnesium or sodium chloride buffer, due at least in part to the limited silicate content.

One or more purification steps are conducted after the magnesiothermic reduction process and by which by-products and impurities are substantially removed. A leach step is preferably one of the one or more purification steps conducted.

Magnesium oxide produced during the magnesiothermic reduction process is removed through the leach step, which is for example a leach in hydrochloric acid at atmospheric pressure. Other impurities, including but not limited to aluminium, calcium and potassium, are also removed during the one or more purification steps.

In a preferred form the leach step is a first of the one or more purification steps.

One or more surface modification steps, after the or each purification step, may be necessary to provide acceptable cell performance, for example carbon coating.

In one form, the method for the production of a silicon-graphite composite material provides for the production of a silicon and graphite composite from a relatively low graphite starting material without the need to produce pure silicon.

The method for the production of a silicon-graphite composite material still further provides for the production of a silicon and graphite composite material without the need for pre-synthesis of the silicate containing graphite material.

The present invention further yet still further provides a method for the production of a silicon-graphite composite material, the method comprising the following steps:
(i) Drying a concentrate of a silicate containing graphite material;
(ii) Mixing of the graphite material with magnesium powder;
(iii) A reduction step in which the mixture from step (ii) is transferred to a furnace whilst subject to a flow of an inert gas, at a temperature of about 600-900° C. for about 1-4 hrs, at the conclusion of which the mixture is allowed to cool;
(iv) An oxidation step in which as the temperature cools to about 500-550° C. the inert gas flow is stopped, and air is allowed into the furnace, after which the temperature of about 500-550° C. is maintained for about 1-2 hrs, at the conclusion of which the mixture is allowed to cool to room temperature; and
(v) A leach step in HCl, as a purification step, with a residence time of between about 1-3 hrs, after which the resulting residue/powder is separated.

In one form, the method further comprises additional purification step(s) in which the powder from step (v) is further purified.

In a further form, the method still further comprises surface modification in which the powder from steps (v) or (vi) is subjected to surface modification.

The present invention further provides a method for the production of an anode comprising the silicon-graphite composite material produced by the method described hereinabove.

The present invention further provides a method for the production of a battery comprising an anode material prepared in accordance with the method described hereinabove.

The present invention yet still further provides a silicon-graphite composite material produced by way of the method described hereinabove.

A suitable silicate containing graphite material has been identified and is available to the Applicant in the Nunasvaara deposit in Sweden, being a predominantly microcrystalline flake Joint Ore Reserves Committee (JORC) mineral resource of 7.6 Mt at 24.4% graphite (Cg). Grades for this deposit have been drill tested at an average of 26.2% Cg, with grades attaining up to 46.7% Cg.

The use of magnesiothermic reduction techniques to reduce silica to porous silica for applications in lithium-ion batteries has been described in detail previously (refer J Entwistle, A Rennie and S Patwardhan., "A review of magnesiothermic reduction of silica to porous silicon for lithium-ion battery applications and beyond" J. Mater. Chem. A, 6 (2018) 18344). Whilst a variety of silica sources are contemplated there is no disclosure of, nor contemplation of, a combined silicate and graphite source. Further, there is no disclosure of, nor contemplation of, a natural graphite in which there is a silicate distribution as the combined silicate and graphite source.

The traditional Mg-reduction (magnesiothermic reduction of silica) is represented as follows:

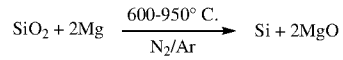

As such, the weight ratio of $SiO_2$ and Mg is 60:48 in the mixture. If there is too much magnesium present, or if it is locally nonuniform, the silicon will further react with magnesium and form Mg2Si. As silica reduction is an exothermic reaction, a thermal buffer, such as NaCl, MgCl and MgO, is mixed with magnesium and silica. Without such a buffer the temperature can't be controlled during the reduction.

In the present invention, the starting material is a silicate containing graphite material, in one form comprising a mixture of graphite, silica and silicate, which can be named GrxMySiOz (Gr=graphite, M=metal ion), and which can be further considered as a mixture of graphite, metal oxide and silicon oxide. The purity of the starting material is in the order of <90% wt/wt graphite, for example between about 60 to 80% wt/wt graphite.

Usually, the magnesium will convert silicon oxide and metal oxide (except Na, K, Ca, Li, Mg) into silicon and metal. That is to say, the required magnesium is dependent on the oxygen content of the starting material, in accordance with the below equation.

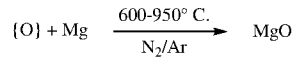

For example, for 100 g of starting material, with a carbon content of 80% wt/wt and oxygen content of 8% wt/wt, the required magnesium is calculated as follows:

(Total weight) × O% × 24/16 = 100g*8%*24/16 = 12g

The content of graphite in the starting material is high, and as graphite is also a good thermal buffer (its specific heat capacity is 0.71 J/(g·K), while NaCl's is 0.86 J/(gK)), no additional thermal buffer is required in the method of the present invention.

In practise it is difficult to achieve the uniform distribution of magnesium in the mixture of magnesium and silicate containing graphite material. Accordingly, $Mg_2Si$ will be formed, which will produce extremely dangerous $SiH_4$ during the leach step, in accordance with the below equation. The Applicants understand this would generally be impossible to apply at large scale (even >50 g).

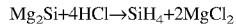

In an effort to address this problem the Applicants have determined that, after the reduction step, for example immediately after, the mixture of magnesium and silica containing graphite material, is subjected to an oxidation step. For example, the oxidation step is a mild oxidation step. The mild conditions include exposure to hot air at a temperature of about 500-550° C. for a period of between about 1 to 2 hours. In this manner the $Mg_2Si$ is converted to silicon and MgO formed, in accordance with the following equation:

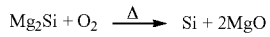
$$Mg_2Si + O_2 \xrightarrow{\Delta} Si + 2MgO$$

The Applicants have identified at least three benefits resulting from the incorporation of this mild oxidation step, including the removal of dangerous $Mg_2Si$, an increase in the silicon yield, and an improvement in the graphite materials electrochemical performance relative to the prior art, such as an improved first cycle efficiency, an improved solid electrolyte interphase (SEI) and an improved capacity retention.

In one form, the method of the present invention comprises the following steps:
  (i) Drying a concentrate of a silicate containing graphite material. Remove the moisture in the concentrate graphite using an oven at 80-100° C. overnight.
  (ii) Mixing of the graphite material with magnesium powder. This mixing may, for example, be achieved using a ball mill (0.5-2 hrs@30-120 rpm) or an overhead mixer (10-30 min@500-1000 rpm).
  (iii) A reduction step in which the mixture from (ii) immediately above is placed in a crucible and transferred to a furnace wherein it is subject to a flow of an inert gas, for example N2 or Ar, and increasing the temperature to about 600-900° C. @3-5° C./min. Then maintaining the temperature at about 600-900° C. for 1-4 hrs, at the conclusion of which the mixture is allowed to cool.
  (iv) An oxidation step, wherein when the temperature cools to about 500-550° C. the inert gas flow is stopped, and air is allowed into the furnace. The temperature of about 500-550° C. is maintained for 1-2 hrs, at the conclusion of which the mixture is allowed to cool to room temperature.
  (v) A leach step, wherein a 3-5 mol/L HCl solution is prepared, and the mixture slowly added thereto whilst stirring. The residence time in the leach is between about 1-3 hrs, with agitation throughout. The HCl solution is subsequently removed and the resulting residue/powder cleaned/collected by way of a filter.
  (vi) Further optional purification step(s), in which the powder from step (v) may be subjected to further purification in one or more other solutions, for example including $HNO_3$, $H_2SO_4$ and HF.
  (vii) Further optional surface modification, wherein the powder from steps (v) or (vi) may be subjected to surface modification, for example carbon coating.

The process of the present invention may be better understood with reference to the following non-limiting examples.

Example

The initial composition of a silicate containing graphite material such as may be utilised as a starting material in the method of the present invention is shown in FIG. 1 as trace (a), showing a range of silicates present, including sodium calcium aluminium silicate, sodium tecto-aluminotrisilicate, sodium aluminium silicate, and potassium magnesium phyllo-magnesiosilicate, amongst others. The carbon content of the silicate containing graphite material is about 80% wt/wt and the oxygen content about 8% wt/wt.

Trace (b) of FIG. 1 shows the XRD composition of the silicon-graphite composite material after magnesiothermic reduction at 750° C. and subsequent purification by way of HCl leaching, and shows silicate related XRD signals significantly reduced and silicon-related signals increased.

Before reduction, the XRD signals from the silicate containing graphite material are dominated by graphite, silicate and silicon dioxide. This can be compared with the XRD signals after reduction, trace (b), wherein the signal from silicate (St) and silicon oxide are significantly reduced and the signal from silicon is significant. This is indicative of the magnesiothermic reduction effectively converting the silicate and silicon oxide into silicon.

Half-cell testing was conducted after magnesiothermic reduction and subsequent purification of the silicon containing graphite material described immediately above, and results showing the impact of reduction temperature are set out in Table 1 below.

TABLE 1

| Reduction temp | Cell ID | FCE (%) | 1st Cycle Capacity (mAh/g) |
|---|---|---|---|
| 650° C. | TaSi085-01 | 79.12% | 458 |
|  | TaSi085-02 | 79.14% | 457 |
|  | TaSi085-03 | 79.08% | 454 |
| 700° C. | TaSi084-01 | 79.83% | 425 |
|  | TaSi084-02 | 79.77% | 424 |
|  | TaSi084-03 | 79.89% | 423 |
| 750° C. | TaSi072-01 | 84.50% | 430 |
|  | TaSi072-02 | 84.48% | 429 |
|  | TaSi072-03 | 84.42% | 426 |
| 825° C. | TaSi073-01 | 83.17% | 417 |
|  | TaSi073-02 | 83.25% | 418 |
|  | TaSi073-03 | 83.14% | 420 |
| 900° C. | TaSi074-01 | 81.47% | 439 |
|  | TaSi074-02 | 81.48% | 441 |
|  | TaSi074-03 | 81.60% | 440 |

The intent was to investigate the influence of temperature on the cell's first cycle efficiency (FCE) and the material's capacity, as they are the two main characteristics of an anode material. As can be seen, the FCE initially increases with the temperature but then decreases. The FCE peaks at a temperature of 750° C. Concerning half-cell capacity, all are high enough compared to a traditional graphite. So, it is understood that 750° C. is the best temperature. The graphite material used in the tests reported in Table 1 are the same as described hereinabove. After reduction, the materials were subjected to a mild oxidation at 550° C. for one hour.

Figure 2:
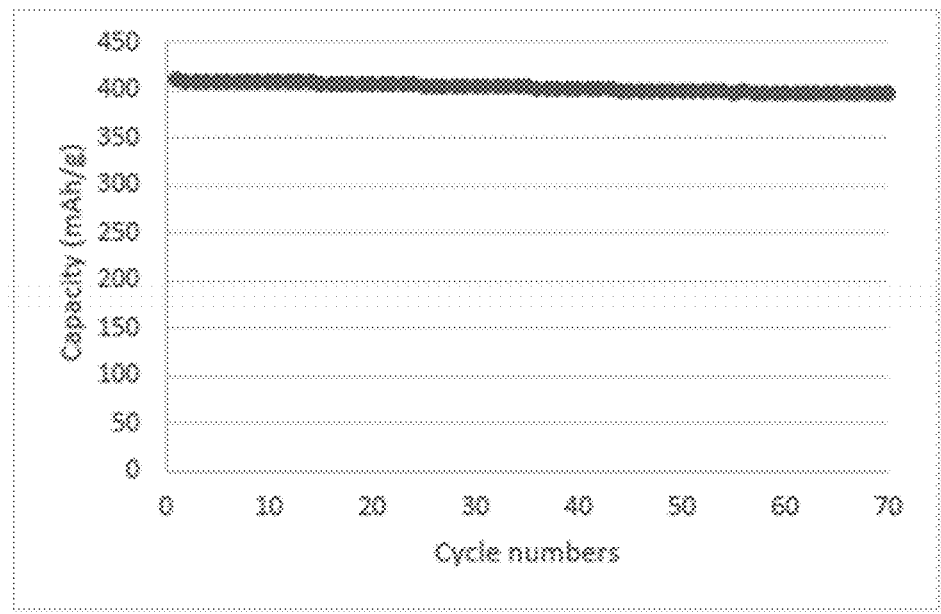
FIG. 2 is a graphical representation of cycle life from a half cell prepared using an anode comprising silicon-graphite composite material prepared in accordance with the present invention.
Figure 3:
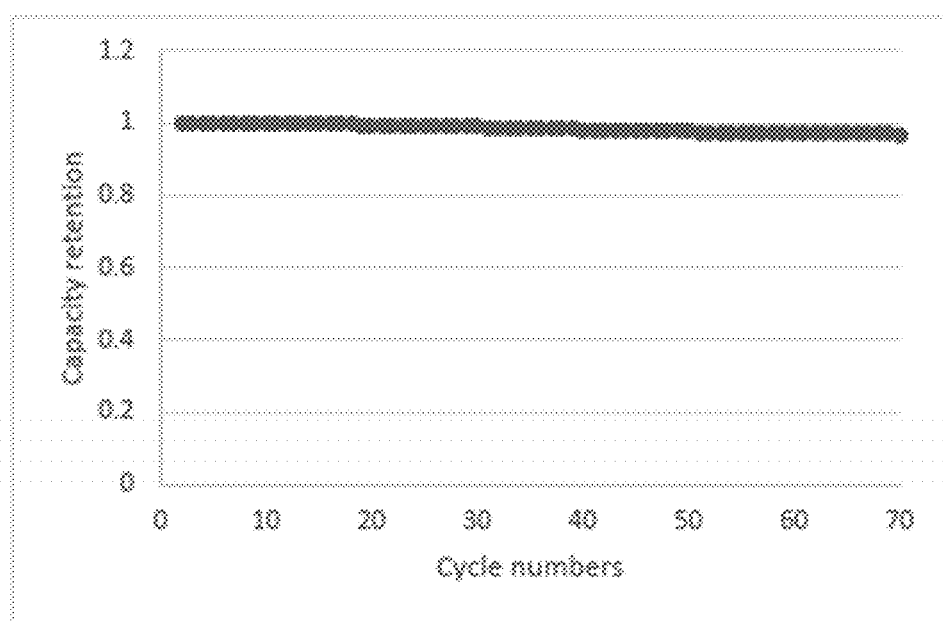
FIG. 3 is a graphical representation of capacity retention from a half cell prepared using an anode comprising silicon-graphite composite material prepared in accordance with the present invention.

Cycling data for the purified silicon-graphite composite material is provided in FIGS. 2 and 3, wherein First cycle: lithiation, CC at C/10 until 5 mV, then CV until C/100; delithiation, CC at C/10 until 1.5V. Other cycles: lithiation, CC at C/5 until 5 mV, then CV until C/40; delithiation, CC at C/5 until 1.5V.

The curve of FIG. 2 shows that the graphite material after reduction has a capacity of 410 mAh/g. This capacity is much higher than the traditional or typical graphite material (for example 340-360 mAh/g).

The concentrate graphite (C %=80% and O %=8%) was reduced at 750° C. for 2 hours with the weight ratio of concentrate graphite:Mg=100:12. After reduction, the material was subjected to a mild oxidation at 550° C. for one hour. After leaching, filtering and purification, the material was further coated with 1,5-Dihydroxynaphthalene (DHN) with the weight ratio of graphite:DHN=100:8. Then, the material was pyrolyzed at 850° C. for two hours in $N_2$ ambient.

In FIG. 3 the curve shows the half-cell capacity retention. For example, the capacity retention in this reduced graphite is 99.8% at the 10th cycle, which is similar to good commercial graphite material presently available.

It is apparent that the capacity from the silicon-graphite composite material is higher than that of the commercial graphite (340-360 mAh/g). In terms of cycle ability, for example capacity retention, the silicon-graphite composite material is similar to the commercial graphite.

Ion chromatography (ICP) results for anions present in the reduced material after mild oxidation are set out in Table 2 below. The graphite material used (C %=80% and O %=8%) was reduced at 750° C. for 2 hours with the weight ratio of concentrate graphite:Mg=100:12. After reduction, the material was subjected to a mild oxidation at 550° C. for one hour.

TABLE 2

| Sample Identification | Assay No. | Anion | Results | Units |
|---|---|---|---|---|
| RSi003-1 | 191096 | fluoride | 11 | ppm |
| | | chloride | 71 | ppm |
| | | bromide | 2 | ppm |
| | | phosphate | 5 | ppm |
| | | sulphate | 130 | ppm |

Inductively coupled plasma optical emission spectrometry (ICP-OES) results for the reduced material are set out in Table 3 below.

TABLE 3

| Sample Identification | Assay No. | Element | Results | Units |
|---|---|---|---|---|
| RSi003-1 | 191097 | ROI | 10.187 | % |
| | 191098 | Ag | 0.1 | ppm |
| | | Al | 0.42 | % |
| | | As | 2.8 | ppm |
| | | B | 14.7 | ppm |
| | | Ca | 64.5 | ppm |
| | | Ce | 0.2 | ppm |
| | | Co | 0.1 | ppm |
| | | Cr | 3.5 | ppm |
| | | Cu | 25.1 | ppm |
| | | Fe | 287.2 | ppm |
| | | Gd | 0.1 | ppm |
| | | K | 87.0 | ppm |
| | | La | 0.1 | ppm |
| | | Li | 0.4 | ppm |
| | | Mg | 498.9 | ppm |
| | | Mn | 6.0 | ppm |
| | | Mo | 9.8 | ppm |
| | | Na | 107.4 | ppm |
| | | Nb | 23.4 | ppm |
| | | Ni | 4.5 | ppm |
| | | P | 8.9 | ppm |
| | | Pb | 255.3 | ppm |
| | | Rb | 0.2 | ppm |
| | | Sb | 0.1 | ppm |
| | | Se | 4.4 | ppm |
| | | Si | 3.75 | % |
| | | Ta | 0.3 | ppm |
| | | Ti | 156.1 | ppm |
| | | V | 5.9 | ppm |
| | | W | 0.3 | ppm |
| | | Zr | 4.8 | ppm |
| | | all other metals | <0.1 | ppm |

As can be seen with reference to the preceding description, the method of the present invention provides a method by which a silicon and graphite composite may be prepared from a relatively low purity graphite starting material, without the need to produce pure silicon and which in turn provides one or more improvements in the cost of graphite purification, combats the issue of anode expansion, and may provide a relatively lower level of environmental impact when compared with prior art methods.

As can also be seen from the above description, the method for the production of a silicon-graphite composite material of the present invention effectively utilises a natural graphite material that has silica/silicate naturally distributed therein, thereby avoiding the need to pre-synthesise a silica/silicate containing graphite material.

The method of the present invention further combines leaching, and the purification of the graphite material, in a single process. This is understood by the Applicants to reduce waste relative to processes of the prior art.

Modifications and variations such as would be apparent to the skilled addressee are considered to fall within the scope of the present invention.

The invention claimed is:

1. A method for the production of a silicon-graphite composite material, the method comprising the following steps:
   (i) drying a concentrate of a silicate containing graphite material comprising a natural graphite material that has a silica/silicate naturally distributed therein;
   (ii) mixing the graphite material with magnesium powder;
   (iii) a reduction step comprising transferring the mixture from step (ii) to a furnace whilst subject to a flow of an inert gas, at a temperature of about 600-900° C. for about 1-4 hrs, at the conclusion of which the mixture is allowed to cool;
   (iv) an oxidation step in which as the temperature cools to about 500-550° C. the inert gas flow is stopped, and air is allowed into the furnace, after which the temperature of about 500-550° C. is maintained for about 1-2 hrs, at the conclusion of which the mixture is allowed to cool to room temperature; and
   (v) a leach step in HCl, as a purification step, with a residence time of between about 1-3 hrs, after which the resulting residue/powder is separated.

2. The method of claim 1, wherein the method further comprises additional purification step(s) in which the powder from step (v) is further purified.

3. The method of claim 1, wherein the method further comprises the surface modification of the powder from steps (v) or (vi).

4. A method for the production of a silicon-graphite composite material, the method comprising:
   subjecting a silicate containing graphite material comprising a natural graphite material that has a silica/silicate naturally distributed therein, to a magnesiothermic reduction process,
   treating a product of the magnesiothermic reduction process in an oxidation step immediately after the magnesiothermic reduction process, and
   subjecting a product of the oxidation step to one or more purification steps, thereby producing a silicon-graphite composite material.

5. The method of claim 4, wherein the silicate containing graphite material is provided at a size of between about 1 to 25 μm or is reduced to this size ahead of the magnesiothermic reduction process.

6. The method of claim 4, wherein the silicate content of the silicate containing graphite material ahead of the magnesiothermic reduction process is between about 1 to 30% wt/wt or is reduced to this level.

7. The method of claim 4, wherein the temperature of a reduction step included in the magnesiothermic reduction process is between about 600 and 900° C.

8. The method of claim 4, wherein no buffer is employed in the magnesiothermic reduction process.

9. The method of claim 4, wherein the one or more purification steps at least substantially removes by-products and impurities.

10. The method of claim 4, wherein a leach step:
   (i) is one of the one or more purification steps conducted; or
   (ii) is a first of the one or more purification steps conducted.

11. The method of claim 10, wherein magnesium oxide produced during the magnesiothermic reduction process is removed in the leach step.

12. The method of claim 4, wherein the silicate containing graphite material has a graphite purity of <90% wt/wt.

13. The method of claim 4, wherein the method for the production of a silicon-graphite composite material provides for the production of a silicon and graphite composite material without the need for pre-synthesis of the silicate containing graphite material.

14. The method of claim 4, wherein the magnesiothermic reduction process comprises mixing the graphite material with magnesium powder and subjecting the mixture to a reduction step.

15. The method of claim 14, wherein the reduction step is conducted in an inert gas atmosphere.

16. The method of claim 4, wherein the oxidation step converts $Mg_2Si$ in the product of the magnesiothermic reduction process to silicon and MgO.

17. The method of claim 4, wherein the oxidation step comprises exposing the product of the magnesiothermic reduction process to hot air.

18. Method of claim 4, wherein the oxidation step is conducted at a temperature of about 500-550° C.

19. The method of claim 4, wherein the oxidation step is conducted for a period between about 1-2 hours.

* * * * *